(12) United States Patent
Ogatsu et al.

(10) Patent No.: US 7,675,659 B2
(45) Date of Patent: Mar. 9, 2010

(54) IMAGE PROCESSING APPARATUS, TABLE GENERATION APPARATUS, AND IMAGE FORMING SYSTEM

(75) Inventors: Hitoshi Ogatsu, Kanagawa (JP);
Masahiko Kubo, Kanagawa (JP);
Michio Kikuchi, Kanagawa (JP);
Shinsuke Sugi, Kanagawa (JP);
Yoshifumi Takebe, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 957 days.

(21) Appl. No.: 11/346,406

(22) Filed: Feb. 3, 2006

(65) Prior Publication Data

US 2007/0024932 A1      Feb. 1, 2007

(30) Foreign Application Priority Data

Jul. 26, 2005   (JP)   .............................. 2005-215741

(51) Int. Cl.
*G03F 3/08* (2006.01)
*G06K 9/00* (2006.01)

(52) U.S. Cl. ..................................... 358/518; 382/167

(58) Field of Classification Search ................ 382/100, 382/103, 112, 135–138, 162, 168, 175, 181, 382/193–195, 232, 255, 257, 274, 275, 276, 382/294, 309, 318, 321, 167; 358/518, 2.1; 235/469

See application file for complete search history.

(56) References Cited

U.S. PATENT DOCUMENTS

| | | | | |
|---|---|---|---|---|
| 5,041,866 A | * | 8/1991 | Imoto | ........................... 355/38 |
| 5,949,055 A | * | 9/1999 | Fleet et al. | ................... 235/469 |
| 6,061,153 A | * | 5/2000 | Sugita | ........................ 358/518 |
| 6,396,595 B1 | | 5/2002 | Shimazaki | |
| 7,245,398 B2 | * | 7/2007 | Namizuka | ................... 358/2.1 |
| 7,280,707 B2 | * | 10/2007 | Perimutter et al. | .......... 382/294 |
| 7,313,289 B2 | * | 12/2007 | Murata et al. | ............... 382/275 |

FOREIGN PATENT DOCUMENTS

| | | |
|---|---|---|
| JP | A-11-041475 | 2/1999 |
| JP | A-2000-299791 | 10/2000 |
| JP | A-2002-135610 | 5/2002 |
| JP | A-2002-152543 | 5/2002 |
| JP | A-2004-072471 | 3/2004 |
| WO | WO 92/06557 A1 | 4/1992 |
| WO | WO 9206557 A1 * | 4/1992 |

OTHER PUBLICATIONS

Oct. 27, 2009 Office Action issued in Japanese patent application No. 2005-215741 with English-language Translation.

* cited by examiner

*Primary Examiner*—Seyed Azarian
(74) *Attorney, Agent, or Firm*—Oliff & Berridge, PLC

(57) ABSTRACT

An image processing apparatus includes: a composite unit that generates a composite parameter used for implementing a time varying variation correction processing for suppressing color variations associated with lapse of time and a spatial variation correction processing for suppressing color variations in accordance with a position in an image, on the basis of a time varying correction parameter used for the time varying variation correction processing and a spatial correction parameter used for the spatial variation correction processing; and an image correction unit that subjects input image data to the time varying variation correction processing and the spatial variation correction processing through use of the composite parameter generated by the composite unit.

17 Claims, 10 Drawing Sheets

TABLE GENERATION UNIT 504

IMAGE FORMING SYSTEM 1

IMAGE PROCESSING APPARATUS, TABLE GENERATION APPARATUS, AND IMAGE FORMING SYSTEM

BACKGROUND

1. Technical Field

The present invention relates to an image processing apparatus which subjects image data to a plurality of correction processing operations.

2. Related Art

In JP-A-2002-135610, there is disclosed an image processing apparatus which diminishes variations in color in a plane through use of an n-dimensional DLUT (Direct Lookup Table).

In JP-A-2002-152543, there is disclosed a color-conversion-coefficient generation apparatus which generates a multi-dimensional lookup table and a one-dimensional lookup table for realizing more faithful color reproduction.

In JP-T-5-502781 (the publication number of the corresponding international patent application is: W092/06557), there is disclosed an image processing system which generates, from a plurality of conversion definitions, a composite conversion definition including sample input and output values obtained after conversion of a composite image, which corresponds to conversion of a plurality of types of images.

SUMMARY

According to the present invention, there is provided at least one of the following configurations.

An image processing apparatus including: a composite unit that generates a composite parameter used for implementing a time varying variation correction processing for suppressing color variations associated with lapse of time and a spatial variation correction processing for suppressing color variations in accordance with a position in an image, on the basis of a time varying correction parameter used for the time varying variation correction processing and a spatial correction parameter used for the spatial variation correction processing; and an image correction unit that subjects input image data to the time varying variation correction processing and the spatial variation correction processing through use of the composite parameter generated by the composite unit.

A table generation apparatus, wherein the number of pieces of output data output after correction processing in a preceding stage differs from the number of pieces of input data input to correction processing in a subsequent stage, the apparatus including: a sample data generation unit that generates a sample data set including a plurality of types of sample data values so as to encompass all types of input data to be used in a plurality of correction processing operations; a first output value computing unit that subjects at least a portion of a sample data set generated by the sample data generation unit to correction processing in a preceding stage, to thus compute output data; a data selection unit that selects data to be input during correction processing in a subsequent stage from among output data computed by the first output value computing unit and sample data values generated by the sample data generation unit; a second output value computing unit that subjects the data selected by the data selection unit to correction processing in a subsequent stage, to thus compute output data; and a table generation unit that generates a composite correction table from a sample data set generated by the sample data generation unit and output data computed by the second output value computing unit.

A table generation apparatus for generating a composite correction table used for implementing a plurality of correction processing operations, wherein a plurality of the correction processing operations include single table correction processing implemented by use of a single correction table and a plurality of table correction processing operations implemented by use of a plurality of correction table operations, the apparatus including: a sample data generation unit that generates a sample data set including a plurality of types of sample data values so as to encompass all types of input data to be used in a plurality of correction processing operations; a first output value computing unit that subjects at least a portion of a sample data set generated by the sample data generation unit to any one of single table correction processing and a plurality of table correction processing operations, to thus compute output data; a data selection unit that selects data to be input during a remaining one of single table correction processing and a plurality of table correction processing operations, from among output data computed by the first output value computing unit and sample data values generated by the sample data generation unit; a second output value computing unit that subjects the data selected by the data selection unit to remaining correction processing of the single table correction processing and the plurality of table correction processing operations, to thus compute output data; and a table generation unit that generates a composite correction table from a sample data set generated by the sample data generation unit and output data computed by the second output value computing unit.

An image forming system including: a table generation apparatus that generates a composite correction table used for implementing a plurality of correction processing operations; and an image forming apparatus that forms an image by use of the composite correction table, the number of pieces of output data output after correction processing in a preceding stage differing from the number of pieces of input data input to correction processing in a subsequent stage. The table generation apparatus includes: a sample data generation unit that generates a sample data set including a plurality of types of sample data values so as to encompass all types of input data to be used in a plurality of correction processing operations; a first output value computing unit that subjects at least a portion of a sample data set generated by the sample data generation unit to correction processing in a preceding stage, to thus compute output data; a data selection unit that selects data to be input during correction processing in a subsequent stage from among output data computed by the first output value computing unit and sample data values generated by the sample data generation unit; a second output value computing unit that subjects the data selected by the data selection unit to correction processing in a subsequent stage, to thus compute output data; and a table generation unit that generates a composite correction table from a sample data set generated by the sample data generation unit and output data computed by the second output value computing unit. The image forming apparatus includes: an image processing unit that subjects input image data to correction processing by use of the composite correction table generated by the table generation unit; and an image forming unit that forms an image by use of the image data having undergone correction processing performed by the image processing unit.

A table generation method for generating a composite correction table used for implementing a plurality of correction processing operations, wherein the number of pieces of output data output after correction processing in a preceding stage differs from the number of pieces of input data input to correction processing in a subsequent stage, the method including: generating a sample data set including a plurality of types of sample data values so as to encompass all types of input data to be used in a plurality of correction processing operations; subjecting at least a portion of a generated sample data set to correction processing in a preceding stage, to thus compute first output data; selecting data to be input during correction processing in a subsequent stage from among computed first output data and generated sample data values; subjecting selected data to correction processing in a subsequent stage, to thus compute second output data; and generating a composite correction table from a generated sample data set and computed second output data.

A program product that causes a computer to generate a composite correction table used for implementing a plurality of correction processing operations, the number of pieces of output data output after correction processing in a preceding stage differing from the number of pieces of input data input to correction processing in a subsequent stage, the program product causing the computer to execute: generating a sample data set including a plurality of types of sample data values so as to encompass all types of input data to be used in a plurality of correction processing operations; subjecting at least a portion of a generated sample data set to correction processing in a preceding stage, to thus compute first output data; selecting data to be input during correction processing in a subsequent stage from among computed first output data and generated sample data values; subjecting selected data to correction processing in a subsequent stage, to thus compute second output data; and generating a composite correction table from a generated sample data set and computed second output data.

DETAILED DESCRIPTION

A printer 10 to which the present invention is applied will now be described.

Figure 1:
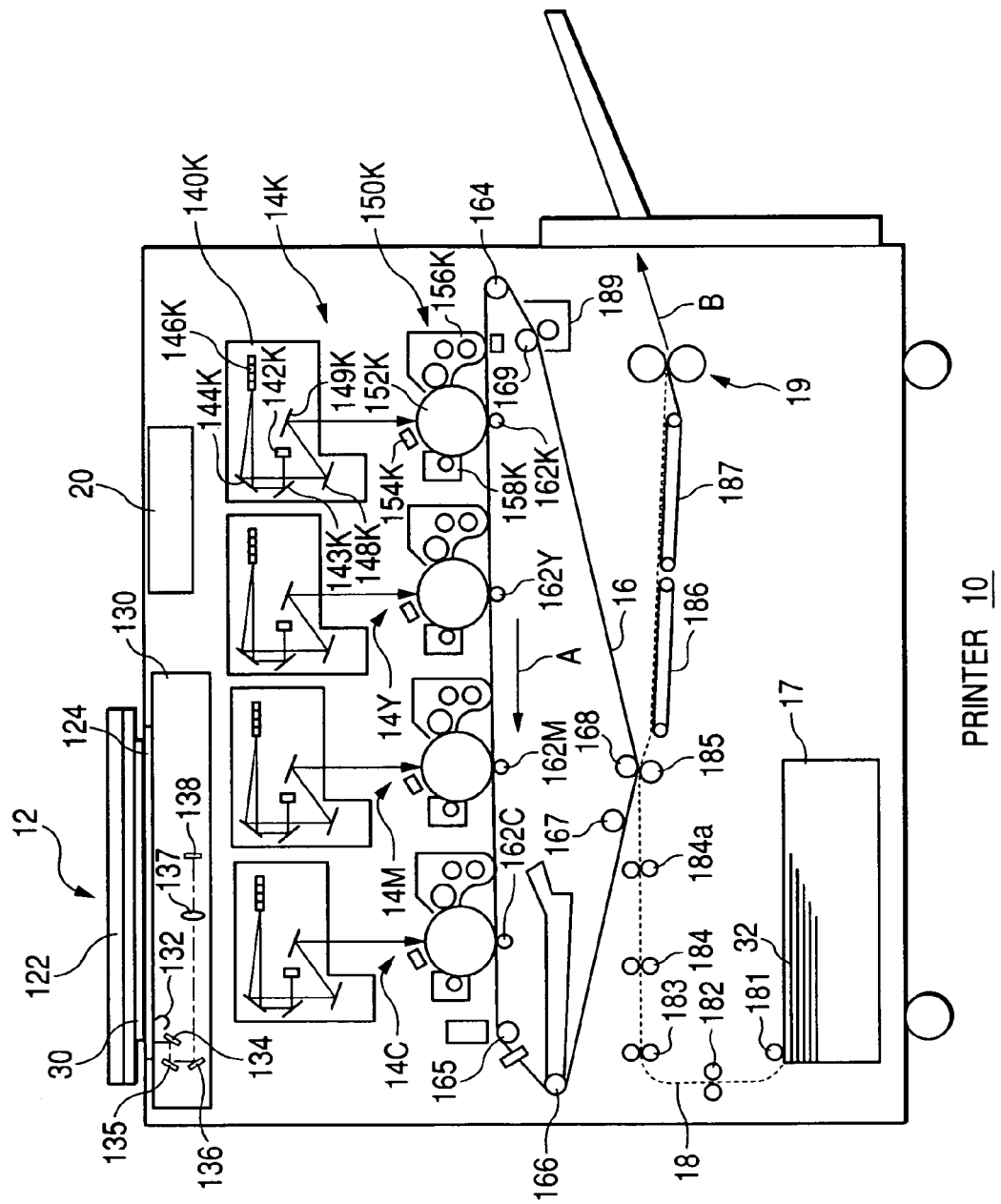
FIG. 1 is a view showing the configuration of a tandem printer 10.

FIG. 1 is a view showing the configuration of the printer 10 of a tandem type.

As shown in FIG. 1, the printer 10 includes an image reading unit 12; an image forming unit 14; an intermediate transfer belt 16; a sheet tray 17; a sheet transport path 18; a fuser 19; and an image processing device 20. This printer 10 may be a multifunction machine that has, in addition to a printer function of printing image data received from a client PC, the function of a full-color copier using the image-reader 12 and the function of a facsimile.

A brief overview of the printer 10 will first be provided. The image reading unit 12 is provided on top of the printer 10, and the image processing device 20 is provided in an upper portion of the same. The image reading unit 12 and the image processing device 20 serve as means for inputting image data. The image-reading device 12 reads an image provided on the original, and outputs the thus-read image to the image processing device 20. The image processing device 20 subjects, by way of a LAN or a network, the image data input from the image reader 12 or the image data input from a client PC, or the like, to image processing such as color conversion, halftone correction, and resolution correction, and outputs the thus-processed image to the image forming unit 14.

A plurality of image forming units 14 are provided below the image reading device 12 in correspondence with respective colors forming a color image. In the present embodiment, a first image forming unit 14K assigned to black (K) color, a second image forming unit 14Y assigned to yellow (Y) color, a third image forming unit 14M assigned to magenta (M) color, and a fourth image forming unit 14C assigned to cyan (C) color are arranged horizontally while being spaced apart at uniform intervals from each other along the intermediate transfer belt 16. The intermediate transfer belt 16 rotates as an intermediate transfer body in the direction of arrow A in the drawing. These four image forming units 14K, 14Y, 14M, and 14C sequentially form toner images of respective colors in accordance with the image data input from the image processing device 20. A plurality of these toner images are transferred to the intermediate transfer belt 16 at timing when they overlap each other (primary transfer). The sequence of colors of the image forming units 14K, 14Y, 14M, 14C is not limited to a sequence of black (K), yellow (Y), magenta (M), and cyan (C), but can be an arbitrary sequence, such as a sequence of yellow (Y), magenta (M), cyan (C), and black (K).

The sheet transport path 18 is provided beneath the intermediate transfer belt 16. A recording sheet 32 supplied from the sheet tray 17 is transported over this sheet transport path 18. Toner images of colors, which have been transported on the intermediate transfer belt 16 in a superposed manner, are collectively transferred onto the intermediate transfer belt 16 (secondary transfer). The thus-transferred toner images are fused onto the recording sheet by the fuser 19, and the recording sheet is then discharged to the outside along the direction of arrow B.

The configurations of individual sections of the printer 10 will now be described.

As shown in FIG. 1, the image reading unit 12 includes a platen glass 124 on which the original is to be placed; a platen cover 122 for bringing the original into pressing contact with the platen glass 124; and an image-reading device 130 for reading an image on the original placed on the platen glass 124. The image-reading device 130 illuminates the original placed on the platen glass 124 by means of a light source 132. An image reading element 138, which is formed from a CCD or the like, is exposed, in a scanning manner, to an image of the light reflected from the original by way of a reduction optical system composed of a full-rate mirror 134, a first half-rate mirror 135, a second half-rate mirror 136, and an image-forming lens 137. An image of light reflected from a color material of the original 30 is read at a predetermined dot density (e.g., 16 dots/mm) by means of the image reading element 138.

The image processing device 20 subjects the image data read by the image reading unit 12 to predetermined image processing such as shading correction, correction of misregistration in the original, brightness/color space conversion, gamma correction, frame erasure, color/shift edition, or the like.

An image processing program 5 (FIG. 2), which will be described later, is installed in the image processing device 20, to thus calibrate colors and correct color variations in an output image.

Images of the light reflected from the color materials of the original read by the image reading unit 12 correspond to reflectivity data pertaining to three colors of the original; e.g., red (R), green (G), and blue (B) (each color being represented by eight bits). By means of image processing performed by the image processing device 20, the images are converted into gradation data pertaining to four color materials of the original; namely, yellow (Y), magenta (M), cyan (C), and black (K) (each color being represented by eight bits).

The first image forming unit 14K, the second image forming unit 14Y, the third image forming unit 14M, and the fourth image forming unit 14C (image forming unit) are horizontally arranged side by side at given intervals. These units are formed essentially analogous to each other in spite of a difference in colors of images formed. The first image forming unit 14K will be described hereinbelow. The configurations of the respective image forming units 14 are distinguished from each other by appending a suffix K, Y, M, or C to reference numeral 14.

The image forming unit 14K has an optical scanning device 140K which scans a laser beam according to the image data input from the image processing device 20, and an image-forming device 150K which forms an electrostatic latent image by means of the laser beam scanned by the optical scanning device 140K.

The optical scanning device 140K modulates a semiconductor laser 142K according to black (K) image data, and emits a laser beam LB(K) from the semiconductor laser 142K in accordance with the image data. The laser beam LB (K) emitted from the semiconductor laser 142K is radiated onto a rotary polygon mirror 146K by way of a first reflection mirror 143K and a second reflection mirror 144K, and undergoes deflection scanning on the rotary polygon mirror 146K. The thus-deflected and scanned laser beam is radiated onto a photosensitive drum 152K of the image-forming device 150K by way of the second reflection mirror 144K, a third reflection mirror 148K, and a fourth reflection mirror 149K.

The image-forming device 150K includes the photosensitive drum 152K, which serves as an image carrier rotating at a predetermined rotational speed in the direction of arrow A; a scorotron 154K which serves as primary electrification purpose (hereinafter called "primary electrification scorotron") for uniformly electrifying the surface of the photosensitive drum 152K; a developer 156K for developing an electrostatic latent image formed on the photosensitive drum 154K; and a cleaning device 158K. The photosensitive drum 152K is uniformly electrified by the scorotron 154K, and an electrostatic latent image is formed on the photosensitive drum 152K by means of the laser beam LB(K) emitted from the optical scanning device 140K. The electrostatic latent image formed on the photosensitive drum 152K is developed with black (K) toner by means of the developer 156K, and the thus-developed image is transferred to the intermediate transfer belt 16. Residual toner, paper dust, or the like, adhering to the photosensitive drum 152K after the process for transferring a toner image is eliminated by the cleaning device 158K.

Likewise, the other image forming units 14Y, 14M, and 14C form toner images of yellow (Y), magenta (M), and cyan (C), and transfer the thus-formed color toner images to the intermediate transfer belt 16.

The intermediate transfer belt 16 is passed, with given tension, around a drive roller 164, a first idle roller 165, a steering roller 166, a second idle roller 167, a backup roller 168, and a third idle roller 169. As a result of the driver roller 164 being rotationally driven by a drive motor (not shown), the intermediate transfer belt 16 is driven in a circulating manner at a given speed in the direction of arrow A. This intermediate transfer belt 16 is formed into an endless belt by means of forming a synthetic resin film having flexibility, such as polyimide, into the shape of a belt, and welding together both ends of the synthetic resin film formed into a belt.

A first primary transfer roller 162K, a second primary transfer roller 162Y, a third primary transfer roller 162M, and a fourth primary transfer roller 162C are provided in positions on the intermediate transfer belt 16 opposing the respective image forming units 14K, 14Y, 14M, and 14C. The toner images of respective colors formed on the photosensitive drums 152K, 152Y, 152M, and 152C are transferred, in a superposed manner, onto the intermediate transfer belt 16 by means of the primary transfer rollers 162. The residual toner adhering to the intermediate transfer belt 16 is eliminated by a cleaning blade or brush of a belt-cleaning device 189 provided downstream of a secondary transfer position.

The sheet transfer path 18 is provided with a sheet roller 181 for withdrawing the recording sheet 32 from the sheet tray 17; a first roller pair 182, a second roller pair 183, a third roller pair 184, all of which are for the purpose of transporting a sheet; and a registration roller 184a for transporting the recording sheet 32 to the secondary transfer position at predetermined timing.

A secondary transfer roller 185 to be brought into pressing contact with the backup roller 168 is placed in the secondary transfer position on the sheet transport path 18. The toner images of respective colors transferred onto the intermediate transfer belt 16 in a superposed manner are transferred to the recording sheet 32 through secondary transfer by means of nipping force and electrostatic force of the secondary transfer roller 185. The recording sheet 32 on which the toner images of respective colors have been transferred is transported to the fuser 19 by means of a first transport belt 186 and a second transport belt 187.

The fuser 19 subjects the recording sheet 32, on which the toner images of respective colors have been transferred, to heating and pressurizing treatment, whereupon toner is fixedly fused to the recording sheet 32.

In the printer 10, there may arise a case where a coloring characteristic of an output image varies with time for reasons of time variations in an environment or constituent members. Such time-varying color variations can be lessened by calibration. In particular, colors which are reproduced by means of mixing a plurality of coloring agents (toner) show nonlinear behaviors. Therefore, it is desirable to realize calibration through use of an n-dimension DLUT which associates input color data pertaining to a plurality of colors with corrected output color data.

Color fluctuations (variations or streaks) may arise in positions within a plane of an image formed, for reasons of variations in the photosensitive characteristic of the surface of the photosensitive drum 152, a cleaning failure of the photosensitive drum 152 or the intermediate transfer belt 16, or flaws in the surface of the photosensitive drum 152 or the intermediate transfer belt 16. Such spatial color fluctuations can be prevented by the n-dimensional DLUT disclosed in the document JP-A-2002-135610.

However, when a DLUT used for effecting calibration and another DLUT used for correcting unevenness are provided in a multistage layout, an increase in processing load and a memory area and a drop in processing speed pose problems. When quantization processing is effected during calibration processing and variation correction processing, errors in quantization accumulate, to thus result in deterioration of color reproduction accuracy.

Accordingly, the printer 10 of the first embodiment merges the DLUT for effecting calibration with the DLUT for correcting variations, and performs processing for correcting an input image through use of the thus-merged DLUT (a merged correction table).

FIRST EMBODIMENT

A first embodiment of the present invention will now be described.

Figure 2:
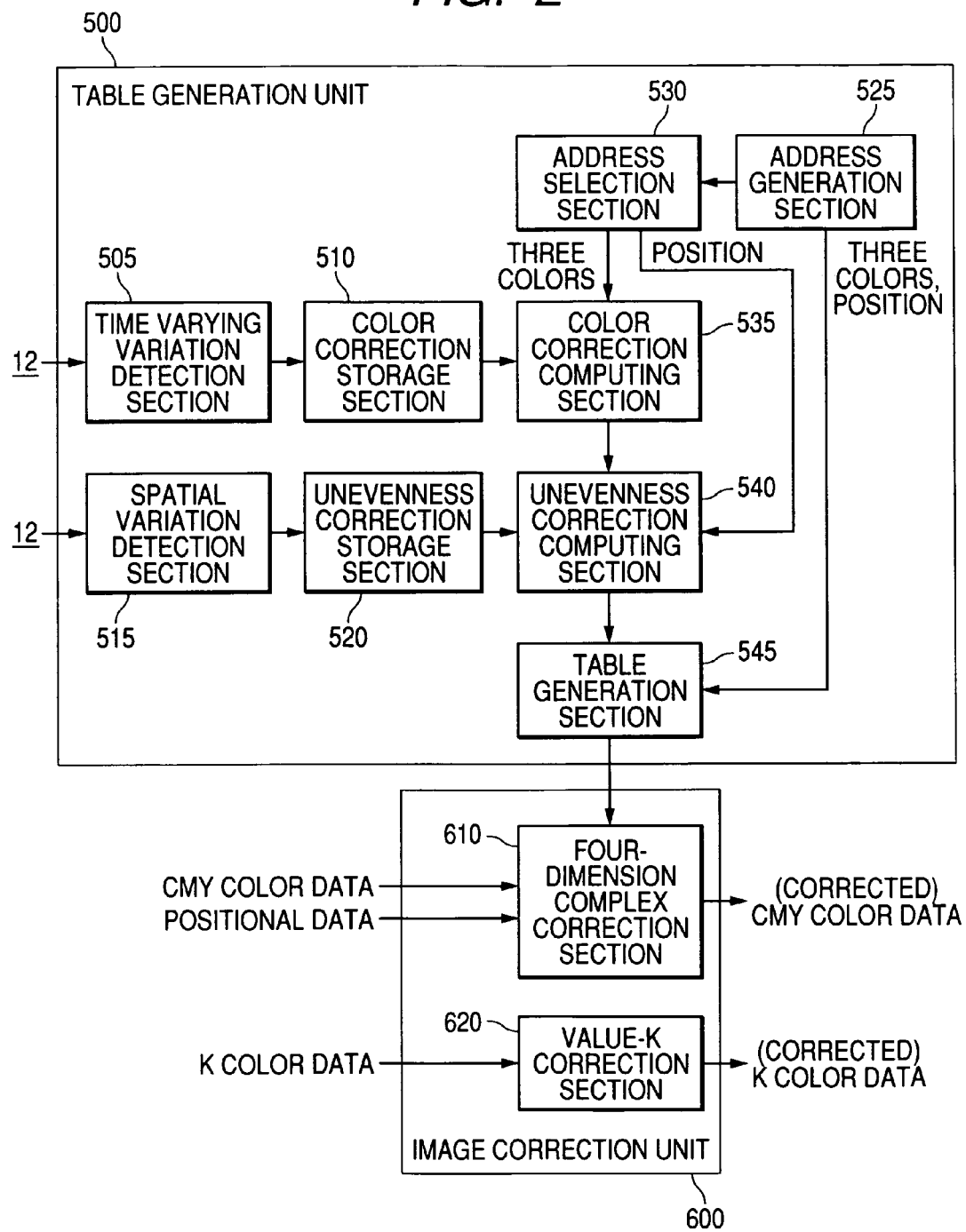
FIG. 2 is a view illustrating the functional configuration of an image processing program 5, which is executed by an image processing apparatus 20 (FIG. 1) and implements a table generation method of the present invention.

FIG. 2 is a view illustrating a functional configuration of an image processing program 5 which is executed by an image processing device 20 (FIG. 1) to implement the table generation method of the present invention.

As shown in FIG. 2, the image processing program 5 has a first table generation unit 500 for generating a composite correction table and a first image correction unit 600 for correcting an input image through use of the composite correction table.

The first table generation unit 500 includes a time varying variation detection section 505, a color correction storage section 510, a spatial variation detection section 515, an unevenness correction storage section 520, an address generation section 525, an address selection section 530, a color correction computing section 535, an unevenness correction computing section 540, and a table generation section 545.

The first image correction unit 600 includes a four-dimensional complex correction section 610 and a value-K correction section 620.

The table generation unit 500 includes a time variation detection section 505 which detects the amount of color variations in an image output device, such as the printer 10, with elapse of time (hereinafter called an "amount of time-varying color variations"), and generates a time varying correction parameter on the basis of the thus-detected amount of variations. The time varying correction parameter is a coefficient which specifies correction processing for neutralizing the amount of time-varying color variations in the printer 10 (hereinafter called "time varying variation correction processing"). In the present embodiment, the coefficient corresponds to color data forming a time varying correction table.

The time variation detection section 505 of the present embodiment controls another configuration of the printer 10, to thus print on the recording sheet 32 a test pattern for color calibration (hereinafter called a "color calibration color test pattern") corresponding to predetermined color data. A time varying correction parameter is generated on the basis of a signal of the color calibration test pattern read from the recording sheet 32 by means of the image reading unit 12.

A color correction storage section 510 stores the time varying correction parameter generated by the time variation detection section 505.

The color correction storage section 510 of the present embodiment stores the color data (the time varying correction parameter) generated by the time variation detection section 505, as a lookup table. Specifically, the color correction storage section 510 stores a spatial correction table. The term "time varying correction table" means a table where data pertaining to a plurality of input colors are associated with the output color data that are corrected when the input color data have undergone time varying variation correction processing. The time varying correction table of the present embodiment associates an input data set value including data pertaining to three colors (a C value, an M value, and a Y value) with the corrected output color data.

A spatial variation detection section 515 detects the amount of color variations (hereinafter called an "amount of spatial color variations") arising in an image output from an image output device, such as the printer 10, in accordance with positions, and generates a spatial correction parameter on the basis of the thus-detected amount of variations. The spatial correction parameter is a coefficient used for specifying correction processing for neutralizing the amounts of spatial color variations in the printer 10 or the like (hereinafter called "spatial variation correction processing"). In the present embodiment, the spatial correction parameter corresponds to color data forming a spatial correction table.

The spatial variation detection section 515 of the present embodiment controls another configuration of the printer 10 to thus print on the recording sheet 32 a variation correction test pattern corresponding to predetermined color data, and generates a spatial correction parameter in accordance with a signal of an unevenness correction test pattern read from the recording sheet 32 by the image reading unit 12.

An unevenness correction storage section 520 stores the spatial correction parameter generated by the spatial variation detection section 515.

The unevenness correction storage section 520 of the present embodiment stores the color data (spatial correction parameter) generated by the spatial variation detection section 515, as a lookup table. Specifically, the unevenness correction storage section 520 stores the spatial correction table. Here, the spatial correction table is a table where each of input data sets, each being formed from input color data and positional information showing a position in an image, is associated with output color data that have been corrected when the input color data have undergone spatial variation correction processing according to positional information. The spatial correction table of the present embodiment associates an input data set value (a C value, an M value, a Y value, and coordinates X in the main scanning direction) including color data pertaining to three colors and positional information with corrected output color data.

An address generation section 525 generates a plurality of types of sample data values so as to encompass all types of input data employed for a plurality of pieces of correction processing, and outputs the thus-generated sample data values to an address selection section 530 and a table generation section 545.

More specifically, the address generation section 525 generates a plurality of sample data sets including a plurality of pieces of color data (value C, value M, and value Y in the present embodiment) and positional information (coordinates X in the present embodiment) so as to encompass input data (the value C, the value M, and the value Y in the present embodiment) used for time varying correction processing and input data (the value C, the value M, the value Y, and the coordinate X in the embodiment) used for spatial correction processing.

The address generation section 525 of the present embodiment generates the sample data sets by means of grouping, into sets, pieces of sample data corresponding to lattice points of the value C, the value M, the value Y, and the coordinate X.

For instance, sample data sets to be generated will become as follows. In the present embodiment, color data (C, M, Y, K) assume values from 0 to 25, and a coordinate assumes values from 0 to 255. A case where an interval between the lattice points is 32 will be described as a specific example.

(C, M, Y, X)=(0, 0, 0, 0), (32, 0, 0, 0), (64, 0, 0, 0), ..., (0, 32, 0, 0), ..., (255, 255, 0, 0), ..., (255, 255, 255, 0), (0, 0, 0, 32), ..., (255, 255, 255, 255)

In this case, the number of sample data sets assumes 9×9×9×9. The spatial correction table, the time varying correction table, and the composite correction table have the values which can be assumed by the value C, the value M, the value Y, and the coordinate X, in the pattern of a multidimensional lattice. During correction processing, values between the lattices are computed by means of interpolating operation. As mentioned above, tables having correction parameters arranged in the pattern of a multidimensional lattice (the spatial correction table, the time varying correction table, and the composite correction table) are provided, so that a memory size can be curtailed. Since the lattice points can be continuously connected together by means of interpolating operation, memory saving and continuous gradation (smoothness of gradation) are implemented.

Interpolation operation includes a multidimensional linear interpolation method, a cubic interpolation method for computing an interpolated value from the volume of an n-dimensional cubic, or a tetrahedron interpolation method for computing an interpolated value from the volume of an n-dimensional tetrahedron.

The address selection section 530 selects input data to be input during correction processing in a preceding stage among the sample data sets generated by the address generation section 525. The address selection section 530 of the present embodiment selects color data from the sample data set (color data and coordinates) generated by the address generation section 525, and outputs the thus-selected color data to a color correction computing section 535.

The address selection section 530 selects input data to be input during correction processing to be performed in a subsequent stage, from among the sample data sets generated by the address generation section 525 and output data generated by correction processing in the previous stage. More specifically, the address selection section 530 selects positional information (coordinates) included in the sample data sets and the color data output from the color correction computing section 535, from among the sample data sets (color data and coordinates) generated by the address generation section 525 and the output data (the color data having undergone time variation correction) output from the color correction computing section 535; and outputs the thus-selected data to an unevenness correction computing section 540. In the present embodiment, the color data output from the color correction computing section 535 are input directly to the unevenness correction computing section 540, and the address selection section 530 outputs the positional information included in the sample data sets to the unevenness correction computing section 540 in synchronism with the color data output from the color correction computing section 535.

The color correction computing section 535 subjects the sample data value (color data) input from the address selection section 530 to time varying variation correction processing through use of the time varying correction table stored in the color correction storage section 510, and outputs to the unevenness correction computing section 540 the sample data value (color data) having undergone time varying variation correction processing.

The color correction computing section 535 of the present embodiment computes output color data (value C', value M', and value Y') corresponding to the sample data values (the value C, the value M, and the value Y) by means of floating point arithmetic operation by reference to the time varying correction table.

When an input data set corresponding to the sample data values (the value C, the value M, and the value Y) do not exist in the time varying correction table, the color correction computing section 535 selects an input data set, which is located in the neighborhood of the sample data set value, from the time varying correction table, and computes output color data (the value C', the value M', and the value Y') through interpolation processing through use of the output data set corresponding to the selected input dataset.

The unevenness correction computing section 540 subjects the color data, which have been computed by the color correction computing section 535, to spatial variation correction processing appropriate to the positional information (the coordinate X) input from the address selection section 530, through use of the spatial correction table stored in the unevenness correction storage section 520; and outputs to the table generation section 545 the sample data value (color data) having undergone spatial variation correction processing.

By reference to the spatial correction table, the unevenness correction computing section 540 of the present embodiment computes output color data (value C", value M", value, and value Y") corresponding to the input data (the value C' value, the value M', and the value Y' input from the color correction computing section 535 and the coordinate X input from the address selection section 530), by reference to the spatial correction table and by means of floating point arithmetic operation.

When the input data set corresponding to the input data values (the value C', the value M', the value Y', and the coordinate X) does not exist in the spatial correction table, the unevenness correction computing section 540 selects the input data set, which is located in the neighborhood of the input data values, from the spatial correction table by means of interpolation operation; and computes output color data (the value C", the value M", and the value Y") through use of the output data set corresponding to the selected input data set. Specifically, interpolation processing performed through spatial variation correction processing is performed on the basis of positional information (coordinates) and color data.

The table generation section 545 takes the color data (the value C", the value M", and the value Y") computed in the unevenness correction computing section 540 as an output data set and the sample data set (the value C, the value M, the value Y, and the coordinate X in the present embodiment) generated by the address generation section 525 as an input data set; generates a composite correction table where the output data set and the input data set are associated with each other; and outputs the thus-generated composite correction table to the first image correction unit 600.

Since the (9×9×9×9) sample data sets are generated as input data sets by the address generation section 525, the table generation section 545 of the present embodiment generates a composite correction table where (256'256'256'128) sample data sets (input data sets) and the output data sets (the value C", the value M", and the Y") computed for the respective sample data sets are associated with each other.

Since the color correction computing section 535 and the unevenness correction computing section 540, both of which are employed in the present embodiment, compute corrected color data by means of floating point arithmetic operation, the color data input to the table generation section 545 are represented as floating points. In contrast, the table generation section 545 subjects the color data, which are expressed by floating points, to rounding operation, to thus convert the color data into color data matching the data size of the composite correction table.

The output data set (the value C", the value M", and the value Y") included in the composite correction table of the present embodiment is a composite correction parameter which has been subjected to time varying variation correction processing by means of the color correction computing section 535 and further to spatial variation correction processing by means of the unevenness correction computing section 540. Consequently, when having been corrected through use of the composite correction table, the input image data become image data having undergone time varying correction processing and spatial variation correction processing. The input data set included in the composite correction table of the present embodiment is formed from three pieces of color data (the value C, the value M, and the value Y) and one piece of positional information (the coordinate X), and hence the input data set is called a four-dimensional table.

In the image correction unit 600, a four-dimensional complex correction section 610 corrects input image data in accordance with a position in an image through use of the composite correction table generated by the table generation section 545.

The four-dimensional complex correction section 610 of the embodiment reads, from the composite correction table generated by the table generation section 545, the values C, the values M, and the values Y of the respective pixels of the input image data and the output data set values (the values C", the values M", and the values Y") corresponding to the coordinates X of the respective pixels; and outputs a read output data set values as the image data that have undergone time varying variation correction processing and spatial variation correction processing.

When an input data set corresponding to the input data values (the values C, the values M, the values Y, and the coordinates X) is not present in the composite correction table, the four-dimensional complex correction section 610 selects an input data set located in the vicinity of the input data set from the spatial correction table by means of interpolation processing, and computes output color data (the values C", the values M", and the values Y") through use of the output data set corresponding to the selected input data set. Interpolation processing employed in this case is carried out on the basis of the positional information (coordinates) about the image and color data.

A K value correction section 620 subjects K values of respective pixels of the input image data to time varying variation correction processing, and outputs the K values having undergone the time varying variation correction processing.

The K value correction section 620 of the present embodiment has a one-dimensional table where sample data pertaining to K values (input data) are associated with sample data pertaining to K values (input data) having undergone time varying variation correction processing; and computes K' values (output data) corresponding to the K values of the input image data by reference to the one-dimensional table of the K values.

Next, operation of the first table generation unit 500 will be described.

Figure 3:
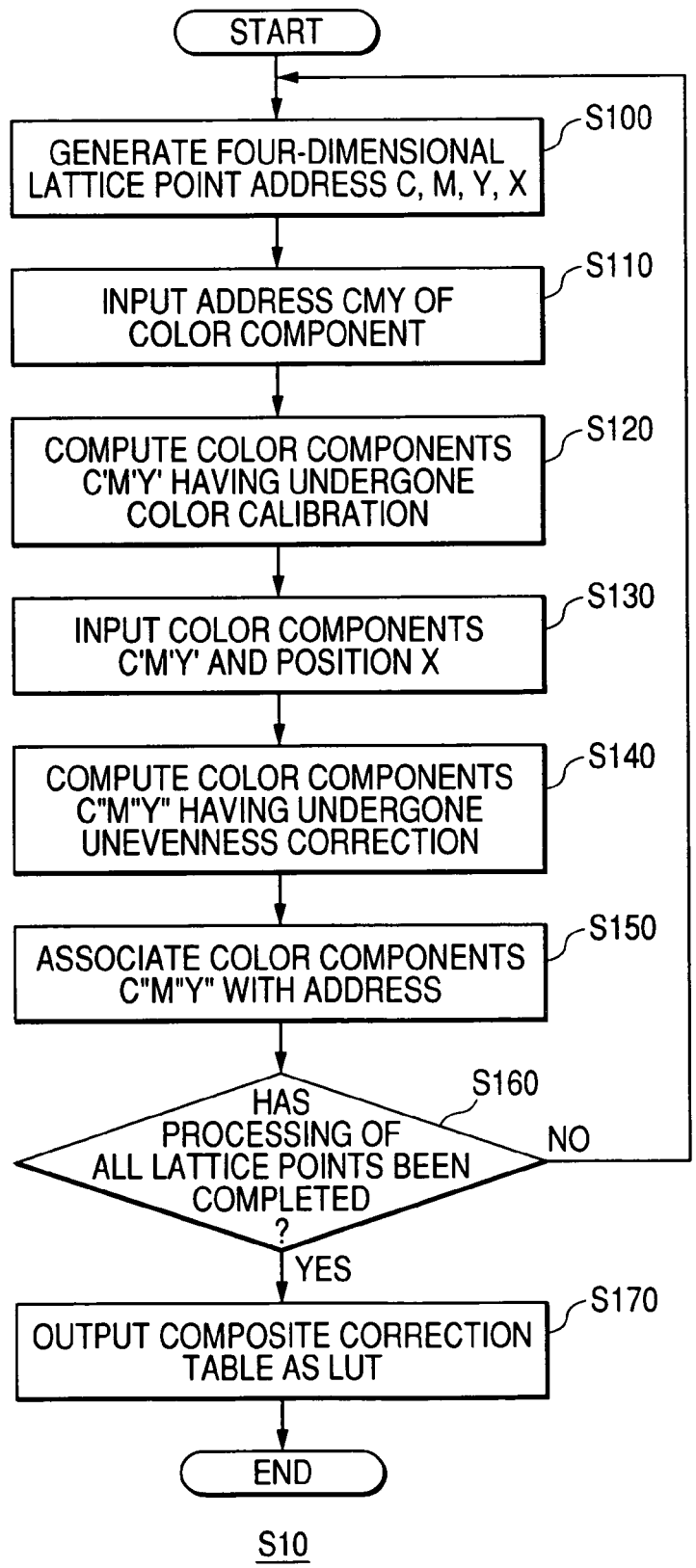
FIG. 3 is a flowchart for describing table merging processing (S10) of the printer 10 (a table generation unit 500)

FIG. 3 is a flowchart for describing table composition processing (S10) of the printer 10 (the first table generation unit 500 included in the image processing program 5). The present embodiment describes, as a specific example, a mode where generation of a composite correction table is started on condition that the time varying correction table stored in the color correction storage section 510 or the spatial correction table stored in the unevenness correction storage section 520 has been updated.

As shown in FIG. 3, when having detected in step 100 (S100) that the time varying correction table stored in the color correction storage section 510 or the spatial correction table stored in the unevenness correction storage section 520 has been updated, the table generation unit 500 (FIG. 2) commands individual configurations to start generation of a composite correction table.

In accordance with a command to start generation, the address generation section 525 generates, in the following sequence, sample data set values including sample data pertaining to component C (a value C of 0 to 255), sample data pertaining to component M (a value M of 0 to 255), sample data pertaining to component Y (a value Y of 0 to 255), and coordinate X in the main scanning direction in an image (a value X of 0 to 127); and outputs the thus-generated sample data set values to the address selection section 530 and the table generation section 545.

In step 110 (S110), the address selection section 530 selects color data (the value C, the value M, and the value Y) from the sample data set values (the value C, the value M, the value Y, and the value X) input from the address generation section 525; and outputs the thus-selected color data (sample color data) to the color correction computing section 535.

In step 120 (S120), the color correction computing section 535 computes color data (the value C', the value M', and the value Y') corresponding to the sample color data (the value C, the value M, and the value Y) input from the address selection section 530, by reference to the latest time varying correction table stored in the color correction storage section 510; and outputs the thus-computed color data (first output color data) to the unevenness correction computing section 540.

In step 130 (S130), the address selection section 530 selects the coordinate X (value X) from the sample data set values (the value C, the value M, the value Y, and the value X) input from the address generation section 525, and outputs the thus-selected coordinate X (sample position data) to the unevenness correction computing section 540.

The unevenness correction computing section 540 acquires, from the address selection section 530, the sample position data (the coordinate X) selected from the sample data set values; and acquires, from the color correction computing section 525, the first output color data computed from the sample color data included in the sample data set values.

In step 140 (S140), the unevenness correction computing section 540 (FIG. 2) computes the sample position data (the coordinate X) input from the address selection section 530 and the color data (the value C", the value M", and the value Y") corresponding to the first output color data (the value C', the value M', and the value Y') input from the color correction computing section 535; and outputs the computed color data (second output color data) to the table generation section 545.

In step 150 (S150), the table generation section 545 takes, as an input data set, the sample data set value (the value C, the value M, the value Y, and the value X) input from the address generation section 525; and takes, as an output data set, second output color data (the value C", the value M", and the value Y") input from the unevenness correction computing section 540. The table generation section 545 associates the output data set with the input data set, to thus make one entry in the composite correction tables.

In step 160 (S160), the table generation unit 500 (FIG. 2) determines whether or not processing has been performed in relation to all the lattice points. When unprocessed lattice points remain, processing returns to S100, where the address generation section 525 is caused to generate sample data set values corresponding to the next lattice point. When processing of all the lattice points has been completed, processing shifts to S170.

In step 170 (S170), the table generation section 545 outputs a composite correction table, which include a plurality of sample data set values (the value C, the value M, the value Y, and the value X) input from the address generation section 525 and a plurality of pieces of second output color data (the value C", the value M", and the value Y") input from the unevenness correction computing section 540, to the image correction unit 600 as a single lookup table.

As has been described above, the printer 10 of the present embodiment merges the time varying correction table, which implements time varying variation correction processing for suppressing time-varying color variations, with the spatial correction table that implements spatial variation correction processing for suppressing spatial color variations, to thus generate a composite correction table.

As a result, the printer 10 can perform time varying variation correction processing and spatial variation correction processing by means of correcting an input image by reference to a single lookup table (the composite correction table). Specifically, since the number of lookup tables can be reduced, the storage area required to store the lookup table can be reduced. Moreover, time varying variation correction processing and spatial variation correction processing can be implemented by means of a single reference (a lookup). Hence, the number of times reference is made to the lookup table is diminished, and a reduction in processing load and speedup of processing speed are achieved. When correction processing is sequentially performed by making reference to the time varying correction table and the spatial correction table, quantization errors are accumulated. However, in the present embodiment, an advantage of time varying variation correction processing and that of spatial variation correction processing can be yielded by single correction processing, and hence accumulation of quantization errors can be prevented.

SECOND EMBODIMENT

A second embodiment of the present invention will now be described.

In the first embodiment, the time varying correction table (a three-dimensional time varying correction table), which associates output data with three pieces of input data, and the spatial correction table (a four-dimensional time varying correction table), which associates output data with four pieces of input data, are merged together, to thus generate the four-dimensional composite correction table. However, the present invention is not limited to this embodiment.

There will be described a mode where the printer 10 of the second embodiment merges a one-dimensional time varying correction table, which associates output data with one piece of input data (the value C, the value M, the value Y, or the value K), with a one-dimensional spatial correction table, which associates output data with one piece of input data (the value C, the value M, the value Y, or the value K), to thus generate a two-dimensional composite correction table.

The spatial correction table of the present embodiment is provided in numbers and applied, in a switching manner, in accordance with a position in the image. Each of a plurality of the spatial correction tables has output color data for canceling color variations which arise depending on a position in an image (especially color variations which arise in the form of streaks).

Figure 4:
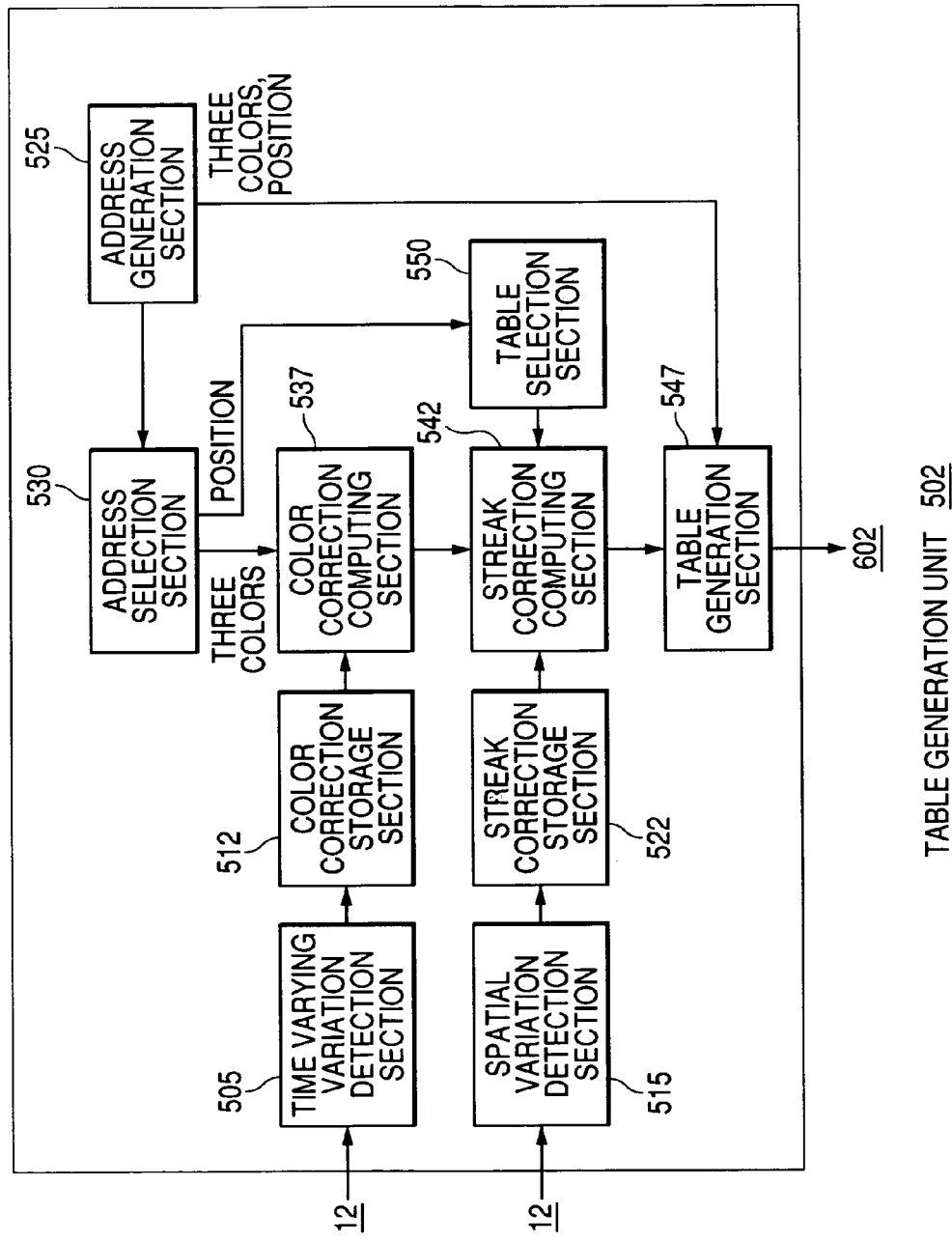
FIG. 4 is a view illustrating the functional configuration of a second table generation unit 502.

FIG. 4 is a view illustrating the functional configuration of the second table generation unit 502. Of the individual elements shown in the drawing, those elements which are substantially identical with those shown in FIG. 2 are assigned the same reference numerals.

As shown in FIG. 4, the second table generation unit 502 has such a configuration that the color correction storage section 510, the unevenness correction storage section 520, the color correction computing section 535, the unevenness correction computing section 540, and the table generation section 545, all of which belong to the first table generation unit 500, are replaced with a second color correction storage section 512, a streak correction storage section 522, a second color correction computing section 537, a streak correction computing section 542, and a second table generation section 547; and where a table selection section 550 is additionally provided.

In the table generation unit 502, the second color correction storage section 512 stores the time varying correction parameter generated by the time varying variation detection section 505 as a one-dimensional time varying correction table. Specifically, in the time varying correction table of the present embodiment, input color data pertaining to one color (the value C, the value M, the value Y, or the value K) are associated with the output color data that have been generated by subjecting the input color data to time varying variation correction processing.

The color correction storage section 512 of the present embodiment stores a plurality of time varying correction tables (namely, a value-C one-dimensional time varying correction table applied to value C, a value-M one-dimensional time varying correction table applied to value M, a value-Y one-dimensional time varying correction table applied to value Y, and a value-K one-dimensional time varying correction table applied to value K).

When compared with the three-dimensional time varying correction table, these one-dimensional time varying correction tables are intended more toward correcting a low-density area (a halftone level having a low toner content) or a monocolor area.

The streak correction storage section 522 stores the spatial correction parameter, which is generated by the spatial variation detection section 515, as a one-dimensional spatial correction table while being associated with a position in an image. Specifically, in the spatial correction table of the present embodiment, input color data pertaining to one color (the value C, the value M, the value Y, or the value K) are associated with output color data which are generated by subjecting the input color data to spatial variation correction processing according to a position in an image. Positional information is associated with each of the spatial correction tables.

The streak correction storage section 522 stores, for each coordinate X in the main scanning direction, the spatial correction tables for respective colors (namely, a value-C one-dimensional spatial correction table applied to value C, a value-M one-dimensional spatial correction table applied to value M, a value-Y one-dimensional spatial correction table applied to value Y, and a value-K one-dimensional spatial correction table applied to value K).

When compared with the four-dimensional spatial correction table, these one-dimensional spatial correction tables are intended more for correcting color variations (i.e., streaks) in a narrower range.

The present embodiment describes, as a specific example, a mode where a plurality of (one-dimensional) time varying correction parameters are applied in accordance with positions in an image. However, a two-dimensional time varying correction table, which takes a position in an image and one piece of color data as an input data set, can be applied, in lieu of the plurality of one-dimensional time varying correction tables, to the present embodiment.

The second color correction computing section 537 subjects the sample data value input from the address selection section 530 to time varying variation correction through use of the one-dimensional time varying correction table stored in the color correction storage section 512, to thus compute the output color data having undergone time varying variation correction processing.

The color correction computing section 537 of the present embodiment computes, in parallel, the value C', the value M', the value Y', and the value K' in relation to the value C, the value M, the value Y, and the value K input from the address selection section 530, by reference to the corresponding one-dimensional time varying correction table.

The table selection section 550 selects the one-dimensional spatial correction table to be applied in accordance with the positional information (the coordinate X in the present embodiment) input from the address selection section 530, and reports the thus-selected one-dimensional spatial correction table to the streak correction computing section 542.

In accordance with the positional information (the coordinate X in the present embodiment) input from the address selection section 530, the table selection section 550 of the present embodiment selects, in parallel, the value-C one-dimensional spatial correction table, the value-M one-dimensional spatial correction table, the value-Y one-dimensional spatial correction table, and the value-K one-dimensional spatial correction table, and reports the thus-selected one-dimensional spatial correction tables of respective colors to the streak correction computing section 542.

The streak correction computing section 542 subjects the sample data value, which have already undergone time varying variation correction processing performed by the color correction computing section 537, to spatial variation correction processing, by use of the one-dimensional spatial correction table selected by the table selection section 550.

The streak correction computing section 542 of the present embodiment subjects the value C', the value M', the value Y', and the value K', all of which have been output from the color correction computing section 537, to streak correction processing by means of applying, in a switching manner, one-dimensional space correction tables of respective colors reported by the table selection section 550, to thus concurrently compute the value C", the value M", the value Y", and the value K".

When intervals between the lattice points of the one-dimensional spatial correction table are small (e.g., an interval between lattice points in the coordinate X is on the order of about one pixel to three pixels), the streak correction computing section 542 can perform spatial variation correction processing without involvement of interpolation processing. However, when intervals between the lattices points on the one-dimensional space correction table are large, the streak correction computing section 542 preferably performs spatial variation correction processing by use of interpolation processing.

On the basis of the sample data value having undergone spatial variation correction processing performed by the streak correction computing section 542 and the sample data set input from the address generation section 525, the second table generation section 547 generates a two-dimensional composite correction table.

The table generation section 547 of the present embodiment takes color data (the value C", the value M", the value Y", or the value K") input from the streak correction computing section 542 as output data; and takes as an input data set a data set, which is input from the address generation section 525 and which is formed from the color data (the value C, the value M, the value Y, or the value K) and the positional information (the coordinate X). Thus, a composite correction table, where the output data and the input data set are associated with each other, is generated in relation to each color.

Figure 5:
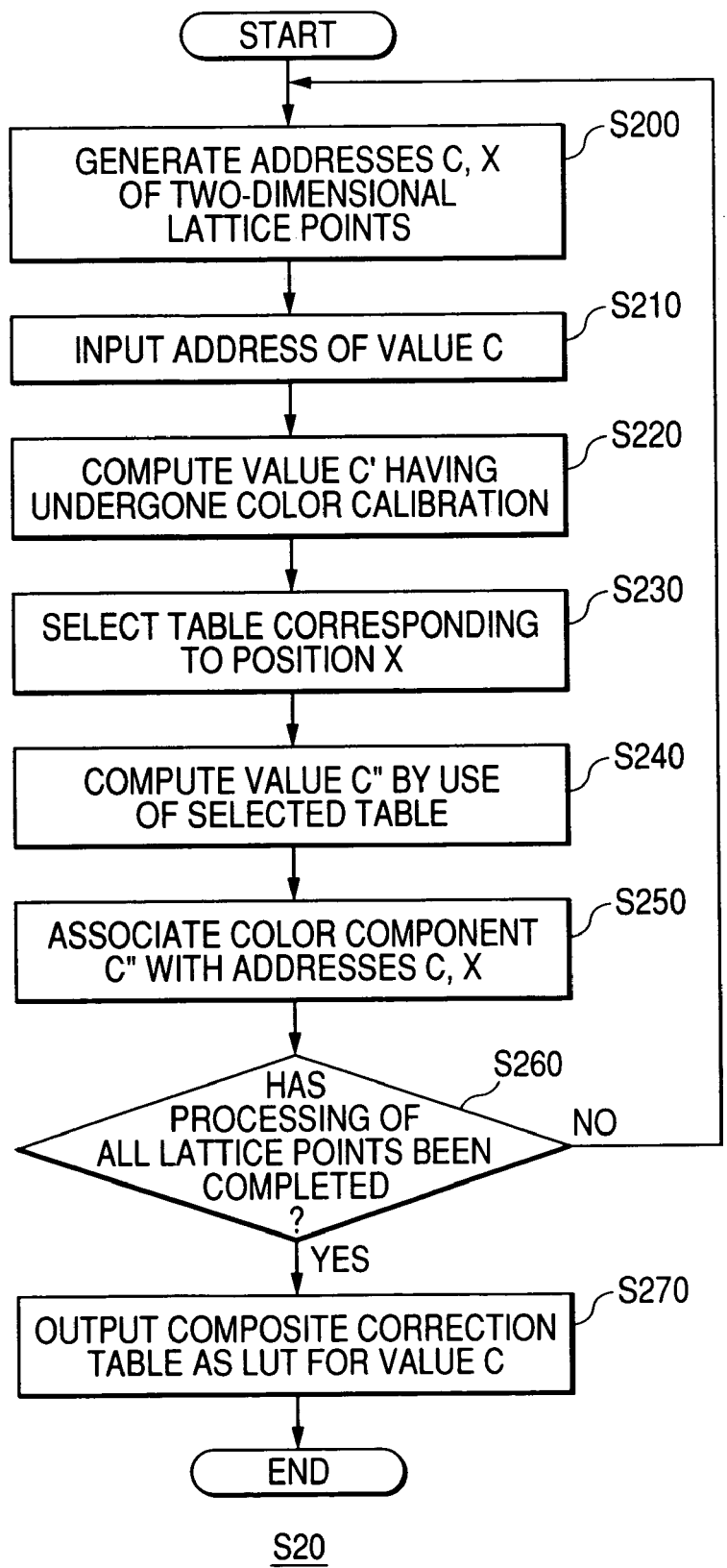
FIG. 5 is a flowchart for describing table merging processing (S20) of a second embodiment of the present invention.

FIG. 5 is a flowchart for describing table merger processing (S20) in the second embodiment. In the present embodiment, a composite correction table is generated independently for each of the value C, the value M, the value Y, and the value K. Hence, in the present flowchart, a description is provided by reference to solely the value C.

As shown in FIG. 5, when having detected in step 200 (S200) that the one-dimensional time varying correction table stored in the color correction storage section 512 or the one-dimensional spatial correction table stored in the streak correction storage section 522 has been updated, the table generation unit 502 (FIG. 4) commands individual elements to start generation of a composite correction table.

In accordance with a command to start generation, the address generation section 525 generates, in the following sequence, sample data set values including sample data pertaining to component C (a value C of 0 to 255) and the coordinate X in the main scanning direction in an image (a value X of 0 to 127); and outputs the thus-generated sample data set values to the address selection section 530 and the table generation section 547.

In step 210 (S210), the address selection section 530 selects color data (the value C) from the sample data set values (the value C, the value M, the value Y, and the value X) input from the address generation section 525; and outputs the thus-selected color data (sample color data) to the color correction computing section 537.

In step 220 (S220), the color correction computing section 537 (FIG. 4) computes color data (the value C') corresponding to the sample color data (the value C) input from the address selection section 530, by reference to the one-dimensional time varying correction table for the value C stored in the color correction storage section 512; and outputs the thus-computed color data (first output color data) to the streak correction computing section 542.

In step 230 (S230), the address selection section 530 selects the coordinate X (value X) from the sample data set values (the value C, the value M, the value Y, and the value X) input from the address generation section 525, and outputs the thus-selected coordinate X (sample position data) to the table selection section 550.

The table selection section 550 selects the one-dimensional spatial correction table for the value C corresponding to the sample position data (the coordinate X) input by the address selection section 530, and reports the selected one-dimensional spatial correction table to the streak correction computing section 542.

In step 240 (S240), the streak correction computing section 542 (FIG. 4) computes color data (the value C") corresponding to the first output color data (the value C') input from the color correction computing section 537 by reference to the one-dimensional spatial correction table for value C (the one-dimensional spatial correction table stored in the streak correction storage section 522) reported by the table selection section 550; and outputs the computed color data (the second output color data) to the table generation section 547.

In step 250 (S250), the table generation section 547 takes, as an input data set, the sample data set value (the value C and the value X) input from the address generation section 525; and takes, as output data, second output color data (the value C") input from the streak correction computing section 542. The table generation section 547 associates the output data with the input data set, to thus make one entry in the two-dimensional composite correction tables for value C.

In step 260 (S260), the table generation unit 502 (FIG. 4) determines whether or not processing has been performed in relation to all the lattice points. When unprocessed lattice points remain, processing returns to S200, where the address generation section 525 is caused to generate sample data set values corresponding to the next lattice point. When processing of all the lattice points has been completed, processing shifts to S270.

In step 270 (S270), the table generation section 547 outputs a composite correction table, which includes a plurality of sample data set values (the value C and the value X) input from the address generation section 525 and a plurality of pieces of second output color data (the value C") input from the streak correction computing section 542, to a second image correction unit 602 (which will be described later) as a single lookup table for value C.

The table generation unit 502 performs table merging processing (S20) in relation to the value M, the value Y, and the value K, as well, whereby a two-dimensional composite correction table is generated for each of these values.

Figure 6:
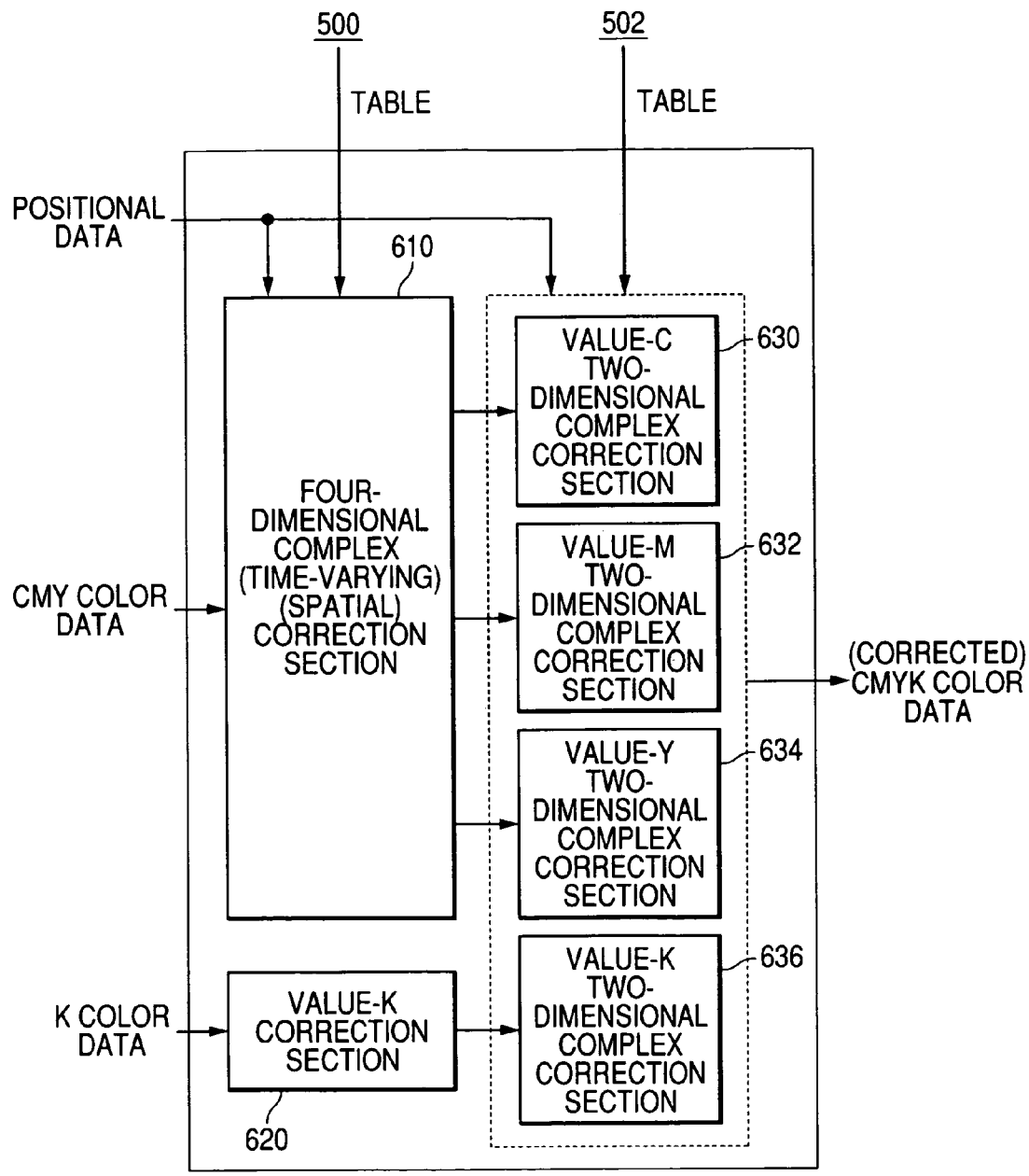
FIG. 6 is a view illustrating the functional configuration of a second image correction unit 602.

FIG. 6 is a view illustrating the functional configuration of the second image correction unit 602. Of the individual elements shown in the drawing, those elements which are substantially identical with those shown in FIG. 2 are assigned the same reference numerals.

As shown in FIG. 6, the second image correction unit 602 has such a configuration that the first image correction unit 600 is added with a value-C two-dimensional complex correction section 630, a value-M two-dimensional complex correction section 632, a value-Y two-dimensional complex correction section 634, and a value-K two-dimensional complex correction section 636.

The value-C two-dimensional complex correction section 630 subjects the value C input from the four-dimensional complex correction section 610 to correction processing by use of the two-dimensional composite correction table for value C generated by the second table generation unit 502 (FIG. 4). When an interval between lattice points of the two-dimensional composite correction table is small, the value-C two-dimensional complex correction section 630 may perform correction processing without carrying out interpolation processing. However, when the interval between lattice points of the two-dimensional composite correction table is large, the value-C two-dimensional complex correction section 630 preferably performs correction processing by use of interpolation processing.

Similarly, the value-M two-dimensional complex correction section 632 and the value-Y two-dimensional complex correction section 634 subject the values M and Y input from the four-dimensional complex correction section 610 to correction processing.

The value-K two-dimensional complex correction section 636 subjects the value K input from the value K correction section 620 to correction processing through use of the two-dimensional composite correction table for value K generated by the second table generation unit 502 (FIG. 4).

As has been described, the printer 10 of the present embodiment can merge the one-dimensional time varying correction table with the two-dimensional spatial correction table, to thus generate the two-dimensional composite correction table.

The printer 10 can acquire an output image with higher color reproduction accuracy, by use of the four-dimensional composite correction table (a correction table chiefly intended for calibrating mixed colors and correcting unevenness) described in connection with the first embodiment and the two-dimensional composite correction table (a correction table chiefly intended for calibrating monochrome and correcting streaks) described in connection with the present embodiment.

THIRD EMBODIMENT

A third embodiment of the present invention will now be described.

The first and second embodiments have described the mode where the two correction tables (the time varying correction table and the spatial correction table) are merged, but the present invention is not limited to this mode.

Accordingly, the third embodiment describes another mode where three correction tables are merged. In the present embodiment, a case where a three-dimensional time varying correction table, a one-dimensional time varying correction table, and a four-dimensional spatial correction table are merged will be described as a specific example.

Figure 7:
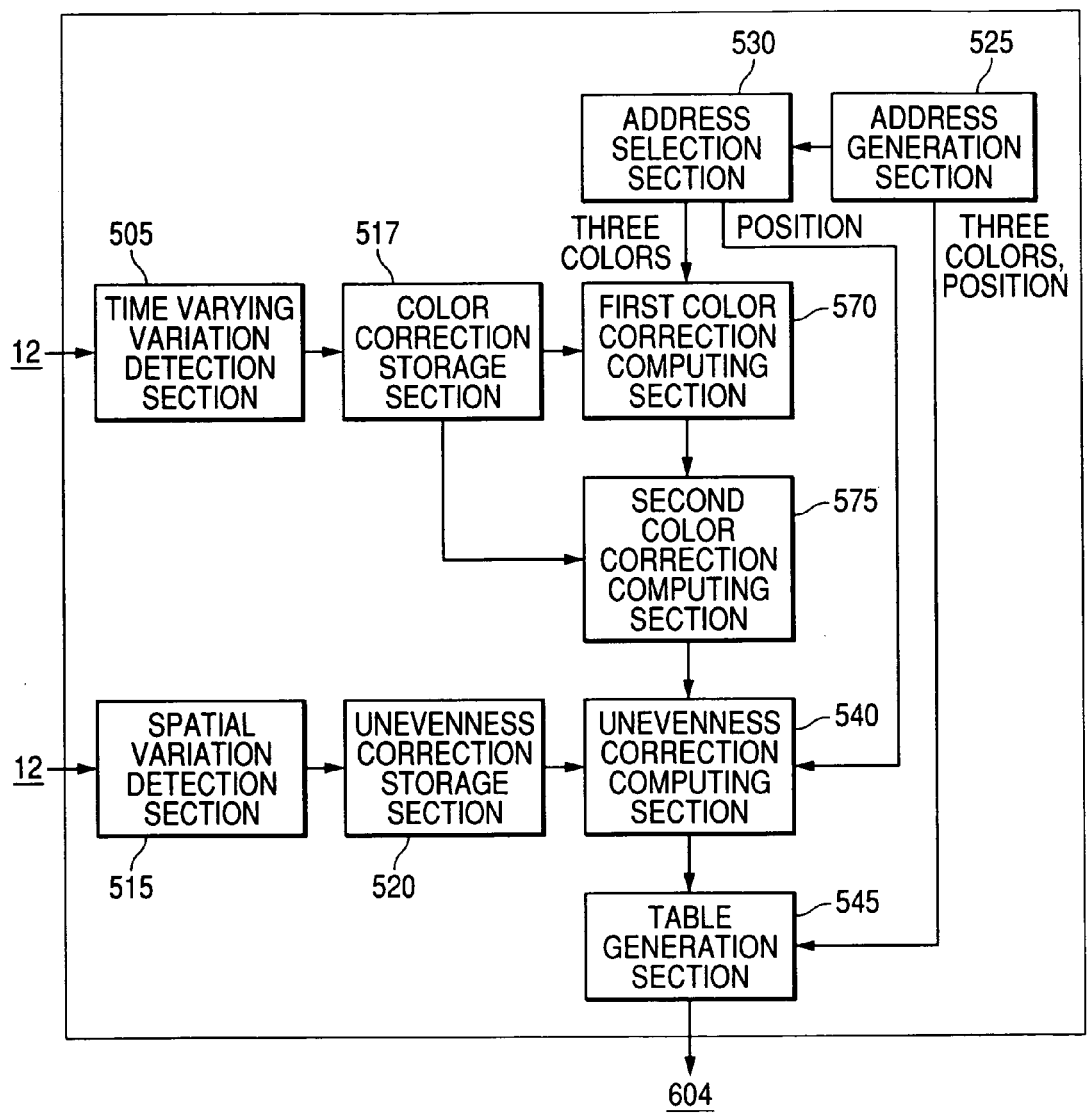
FIG. 7 is a view illustrating the functional configuration of a third table generation unit 504.

FIG. 7 is a view illustrating a functional configuration of a third table generation unit 504. Of the individual elements shown in the drawing, those elements which are substantially identical with those shown in FIG. 2 are assigned the same reference numerals.

As shown in FIG. 7, the third table generation unit 504 has such a configuration that the color correction storage section 510 and the color correction computing section 535, both of which belong to the first table generation -unit 500, are replaced with a third color correction storage section 514 and a first color correction computing section 570; and where a second color correction computing section 575 is additionally provided.

In the table generation unit 504, the third color correction storage section 514 stores the time varying correction parameter generated by the time varying variation detection section 505 as a three-dimensional time varying correction table and a one-dimensional time varying correction table. Specifically, in the three-dimensional time varying correction table, input data set values (the value C, the value M, and the value Y) including color data pertaining to three colors are associated with the output color data having undergone time varying variation correction processing. In the one-dimensional time varying correction table, the input color data pertaining to one color (the value C, the value M, the value Y, or the value K) are associated with the output color data that are made by subjecting the input color data to time varying variation correction processing.

The first color correction computing section 570 subjects the sample data value (color data) input from the address selection section 530 to first time varying variation correction processing by use of the three-dimensional time varying correction table stored in the color correction storage section 514, and outputs the sample data value (color data) having undergone the first time varying variation correction processing to the second color correction computing section 575.

The second color correction computing section 575 subjects the color data input from the first color correction computing section 570 to second time varying variation correction processing by use of the one-dimensional time varying correction table stored in the color correction storage section 514, and outputs the color data having undergone the second time varying variation correction processing to the unevenness correction computing section 540. The second color correction computing section 575 of the present embodiment applies the one-dimensional time varying correction tables of respective colors to the data values of respective colors input from the first color correction computing section 570, to thus compute output data of respective colors.

The unevenness correction computing section 540 of the present embodiment subjects, through use of the spatial correction table stored in the unevenness correction storage section 520, the color data input from the second color correction computing section 575 to spatial variation correction processing corresponding to positional information (the coordinate X) input from the address selection section 530.

Figure 8:
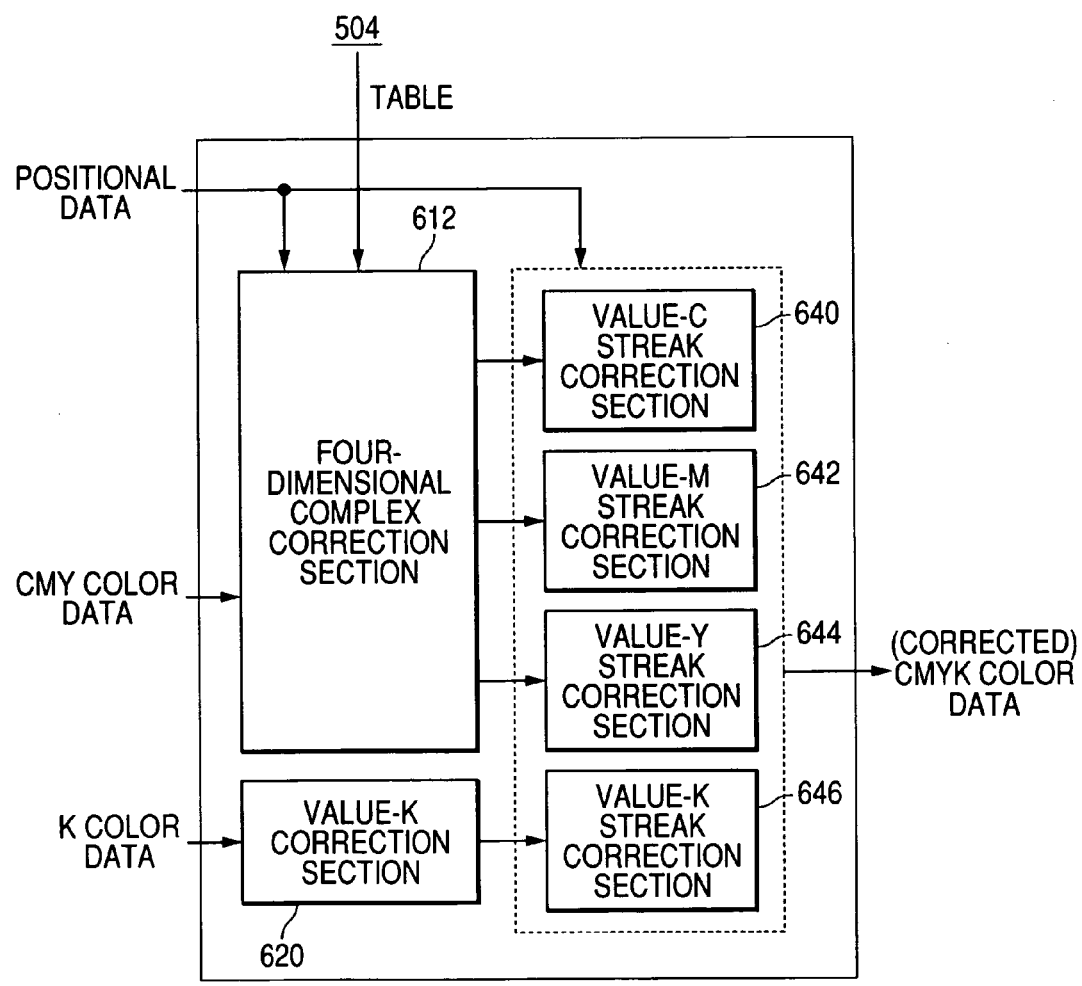
FIG. 8 is a view illustrating the functional configuration of a third image correction unit 604.

FIG. 8 is a view illustrating a functional configuration of a third image correction unit 604. Of the individual elements shown in the drawing, those elements which are substantially identical with those shown in FIG. 2 are assigned the same reference numerals.

As shown in FIG. 8, the third image correction unit 604 has such a configuration that the four-dimension complex correction section 610 of the first image correction unit 600 is replaced with a second four-dimension complex correction section 612; and where a value-C streak correction section 640, a value-M streak correction section 642, a value-Y streak correction section 644, and a value-K streak correction section 646 are additionally provided.

In the image correction unit 604, the second four-dimensional complex correction section 612 calculates output image data (the value C, the value M, and the value Y) corresponding to the value C, the value M, and the value Y of an input image data and the position of the image data, by use of the composite correction table generated by the third table generation unit 504 (i.e., the correction table which implements first time varying variation correction processing, second time varying variation correction processing, and spatial variation correction processing).

The value-C streak correction section 640 has a plurality of one-dimensional value-C spatial correction tables, where an input value C and a value C to be output are associated with each other. Depending on a position in an image, the value-C streak correction section 640 switches the value-C spatial correction tables, to thus compute a value C which corresponds to the input value C and is to be output. Each of the value-C spatial correction tables of the value-C streak correction sections 640 has output color data used for canceling color variations (streaks) which are likely to arise depending on a position in the image.

Consequently, the value-C streak correction section 640 selects the value-C spatial correction table depending on a position in the image; reads a value C, which corresponds to the value C input from the four-dimensional complex correction section 612 and is to be output, by reference to the selected value-C spatial correction table, to thus be able to compute a value C having undergone streak correction.

Similarly, the value-M streak correction section 642 switches a plurality of the value-M spatial correction tables; applies the thus-switched value-M spatial correction table; and subjects to streak correction a value M output from the four-dimensional complex correction section 612. The value-Y streak correction section 644 switches a plurality of the value-Y spatial correction tables; applies the thus-switched value-Y spatial correction table; and subjects to streak correction a value Y output from the four-dimensional complex correction section 612. The value-K streak correction section 646 applies, in a switching manner, a plurality of the value-K spatial correction tables and subjects the value K output from the value-K correction section 620 to streak correction.

As has been described, the printer 10 of the third embodiment merges together a three-dimensional time varying correction table (for calibrating mixed colors) a one-dimensional time varying correction table (for calibrating monochrome), and a four-dimensional spatial correction table (for correcting unevenness), to thus prepare a single composite correction table.

Thus, three correction processing operations (calibration of mixed colors, calibration of monochrome, and correction of unevenness) are realized by reference to a single composite correction table. Accordingly, accumulation of quantization errors and a reduction in processing cost can be achieved.

In the present embodiment, the one-dimensional time varying correction table (value K) used by the value-K correction section 620 (FIG. 8) and the one-dimensional spatial correction table (value K) used by the value-K streak correction section 646 may be merged together.

Figure 9:
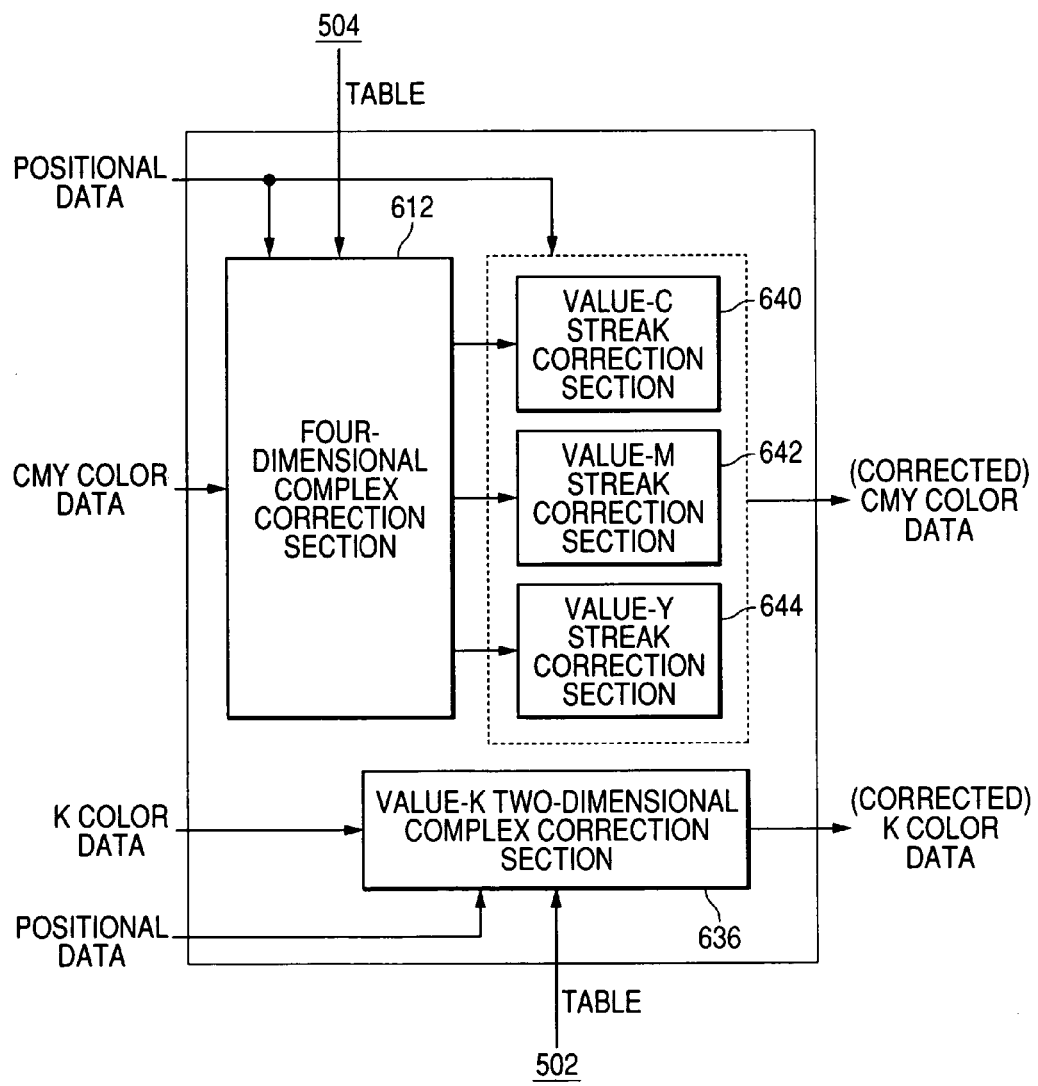
FIG. 9 is a view illustrating a fourth image correction unit 606.

FIG. 9 is a view illustrating an image correction unit 606 achieved when the time varying correction table (value K) and the spatial correction table (value K) are merged together. A one-dimensional time varying correction value (value K) used by the value-K correction section 620 (FIG. 8) and a one-dimensional spatial correction table (value K) used by the value-K streak correction section 646 are merged by the table generation unit 502 illustrated in FIG. 4.

As shown in FIG. 9, the fourth image correction unit 606 has a configuration where the value-K correction section 620 and the value-K streak correction section 646, both of which belong to the third image correction unit 604 (FIG. 8), are replaced with the value-K two-dimensional complex correction section 636.

In the fourth image correction unit 606, the value-K two-dimensional complex correction section 636 computes a value K, which corresponds to an input value K and is to be output, through use of a two-dimensional composite correction table (value K) generated by the second table generation unit 502 shown in FIG. 4.

As mentioned above, the value-K two-dimensional complex correction section 636 enables calibration of a value K (time varying variation correction processing) and correction of streaks (spatial variation correction processing) by means of reading solely a value K, which corresponds to an input value K and is to be output, by reference to the composite correction table (value K).

FOURTH EMBODIMENT

A fourth embodiment of the present invention will now be described.

The previous embodiment has described the mode where the printer 10 performs generation of a composite correction table and correction processing. However, the fourth embodiment describes a mode where the table generation device 8 generates a composite correction table and provides the thus-generated composite correction table to each of the printers 10.

In the above-described embodiment, time varying variation correction processing is for suppressing time-varying color variations in an individual printer 10. The fourth embodiment is intended for machine-difference variation correction processing for reducing a difference in color reproducibility among a plurality of the printers 10. Time varying variation correction processing and machine-difference variation correction processing are specific examples of another factor variation correction processing of the present invention.

Figure 10:
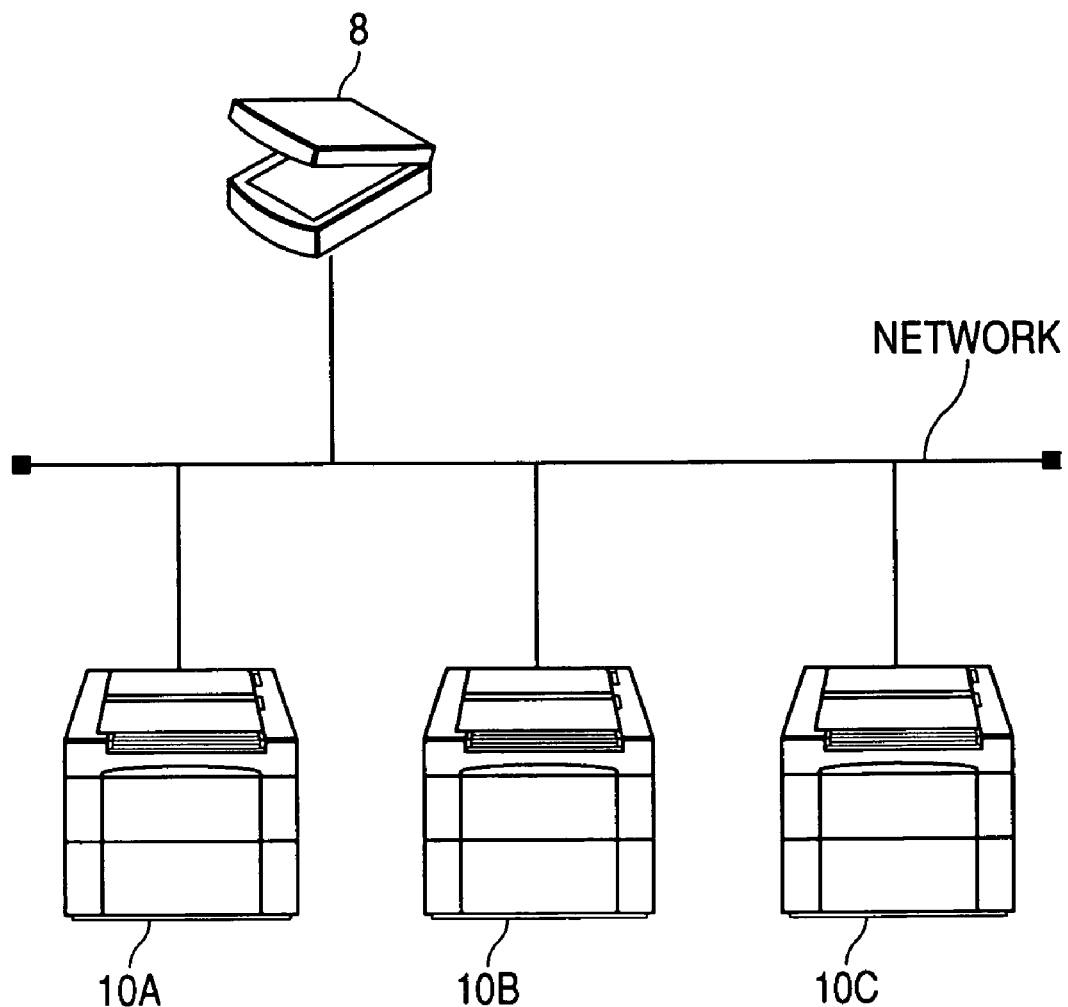
FIG. 10 is a view illustrating the overall configuration of an image forming system 1.

FIG. 10 is a view illustrating the overall configuration of an image forming system 1.

As shown in FIG. 10, the image forming system 1 has a table generation device 8 and a plurality of printers 10A to 10C.

The table generation device 8 is a computer device in which is installed the table generation unit 500 shown in FIG. 2. In the present embodiment, the table generation device 8 has an image reading function.

The table generation device 8 reads test patterns printed on recording sheets with the respective printers 10; computes the amount of time-varying color variations and the amount of color variations due to a difference between machines; and generates a time varying correction table according to the amounts of computed color variations. More specifically, the time varying variation detection section 505 of the table generation device 8 (FIG. 2) compares the test patterns printed by a plurality of printers 10 with color data adopted as standards, to thus generate a spatial correction parameter. The color data, which are employed as standards, are common to a plurality of the printers, and therefore generated spatial correction parameters suppress color variations attributable to a difference between machines as well as the amount of time-varying color variations.

The table generation device 8 merges the time varying correction tables generated for the respective printers with the spatial correction tables generated for the respective printers 10, to thus generate a composite correction table; and provides the respective printers 10 with the thus-generated composite correction table. More specifically, the spatial variation detection section 515 of the table generation device 8 generates a spatial correction parameter for each of the printers. The address generation section 525, the address selection section 530, the color correction computing section 535, the unevenness correction computing section 540, and the table generation section 545 synergistically operate to thus merge the time varying correction table (the time varying correction parameter) and the spatial correction table (the spatial correction parameter) in relation to each of the printers, to thus generate a composite correction table.

The image correction unit 600 shown in FIG. 2 is installed in the respective printers 10A to 10C of the present embodiment.

The printers 10A to 10C are connected to the table generation device 8 by way of the network; subject input image data to image processing by use of the composite correction table provided by the table generation device 8; and print an image on a recording sheet on the basis of the image data having undergone image processing.

As has been described above, the table generation device 8 of the present embodiment merges the time varying correction table, which also suppresses color variations attributable to a difference among a plurality of the printers, with the spatial correction table which suppresses unevenness in the plane of an image formed by each of the printers; and provides the thus-generated composite correction table to each of the printers 10. Each of the printers 10 subjects an input image to correction processing by use of the composite correction table provided by the table generation device 8.

The image forming system 1 can suppress time-varying color variations arising in the respective printers, color variations among a plurality of printers (variations in a coloring characteristic), and unevenness in an image to be formed (including streaks).

As described with reference to the embodiments, according to the image forming system of the present invention, an image can be formed with higher accuracy of color reproduction.

The invention is not limited to the embodiments described above, and various modifications are possible without departing from the spirit and scope of the invention. The components of the embodiments can be combined with each other arbitrarily without departing from the spirit and scope of the invention.

The entire disclosure of Japanese Patent Application No. 2005-215741 filed on Jul. 26, 2005 including specification, claims, drawings and abstract is incorporated herein by reference in its entirety.

What is claimed is:

1. An image processing apparatus comprising:
a composite unit that generates a composite parameter used for implementing a time varying variation correction processing for suppressing color variations associated with lapse of time and a spatial variation correction processing for suppressing color variations in accordance with a position in an image, on the basis of a time varying correction parameter used for the time varying variation correction processing and a spatial correction parameter used for the spatial variation correction processing; and
an image correction unit that subjects input image data to the time varying variation correction processing and the spatial variation correction processing through use of the composite parameter generated by the composite unit.

2. The image processing apparatus according to claim 1, wherein the spatial correction processing is realized through use of a spatial correction table which associates corrected color data with an input data set including positional information that shows positions in an image, and a plurality of types of pieces of color data,
wherein the spatial correction parameter forms the spatial correction table,
wherein the composite unit generates a composite correction table that associates corrected color data with the input data set including the positional information and a plurality of types of the pieces of color data, on the basis of the time varying correction parameter and the spatial correction parameter, and
wherein the image correction unit computes corrected color data that correspond to positions in an image and a plurality of types of the pieces of color data included in input image data, through use of the composite table.

3. The image processing apparatus according to claim 1, wherein the spatial correction processing is implemented by applying in a switching manner any of the spatial correction tables that associate corrected color data with a single piece of input color data, in accordance with a position in an image,
wherein each of the spatial correction tables is formed by the spatial correction parameter,
wherein the composite unit generates a composite correction table that associates color data with an input data set including positional information and color data, on the basis of the time varying correction parameter and the spatial correction parameter, and wherein the image correction unit computes corrected color data that correspond to positions in an image and color data included in input image data, through use of the composite table.

4. The image processing apparatus according to claim 1, wherein the spatial correction processing includes:
a first spatial correction processing that is implemented by use of a multidimensional spatial correction table that associates corrected color data with an input data set including positional information showing positions in an image and a plurality of types of pieces of color data; and
a second spatial correction processing that is implemented by applying in a switching manner any of primary spatial correction tables that associate corrected color data with a single piece of input color data, in accordance with a position in an image,
wherein the composite unit generates a composite correction table that associates corrected color data with the input data set including the positional information and a plurality of types of the pieces of color data, on the basis of the time varying correction parameter, the multi-dimensional spatial correction table, and a plurality of the primary spatial correction tables, and
wherein the image correction unit computes corrected color data that correspond to positions in an image and a plurality of types of the pieces of color data included in input image data, through use of the composite table.

5. The image processing apparatus according to claim 2, wherein the time varying correction processing is implemented by use of a time varying correction table that associates corrected color data with an input data set including a plurality of types of pieces of color data,
wherein the time varying correction parameter forms the time varying correction table,
wherein the composite unit generates a composite correction table that associates corrected color data with the input data set including the positional information and a plurality of types of the pieces of color data, on the basis of the time varying correction parameter and the spatial correction parameter, and
wherein the image correction unit computes corrected color data that correspond to positions in an image and a plurality of types of the pieces of color data included in input image data, through use of the composite table.

6. The image processing apparatus according to claim 2, wherein the time varying correction processing is implemented through use of a time varying correction table that associates corrected color data with a single piece of input color data,
wherein the time varying correction parameter forms the time varying correction table,
wherein the composite unit generates a composite correction table that associates color data with an input data set including positional information and color data, on the basis of the time varying correction parameter and the spatial correction parameter, and
wherein the image correction unit computes corrected color data that correspond to positions in an image and color data included in input image data, through use of the composite table.

7. The image processing apparatus according to claim 2, wherein the time varying correction processing includes:
a first time varying correction processing that is implemented by use of a multidimensional time varying correction table that associates corrected color data with input data set including a plurality of types of pieces of color data; and
a second time varying correction processing that is implemented through use of a primary time varying correction table which associates corrected color data with a single piece of input color data,
wherein the composite unit generates a composite correction table that associates corrected color data with the input data set including the positional information and a plurality of types of the pieces of color data, on the basis of the multidimensional time varying correction table, the one-dimensional time varying correction table, and the spatial correction parameter, and
wherein the image correction unit computes corrected color data that correspond to positions in an image and a plurality of types of the pieces of color data included in input image data, through use of the composite table.

8. The image processing apparatus according to claim 1, wherein the composite unit includes:
a sample data generation unit that generates positional information showing positions in an image and sample value of color data;
a time varying correction value computing unit that computes color data corresponding to a sample value of color data generated by the sample data generation unit through use of the time varying correction parameter;
a spatial correction value computing unit that computes, through use of the spatial correction parameter, color data computed by the time varying correction value computing unit and color data corresponding to a sample value of positional information generated by the sample data generation unit; and
a table generation unit that generates a composite correction table, which associates the color data computed by the spatial correction value computing unit with the sample value of the positional information and the sample value of the color data, both of which being generated by the sample data generation unit.

9. The image processing apparatus according to claim 8, wherein the time varying correction value computing unit and the spatial correction value computing unit compute color data by floating point arithmetic operation.

10. A table generation apparatus, wherein the number of pieces of output data output after correction processing in a preceding stage differs from the number of pieces of input data input to correction processing in a subsequent stage, the apparatus comprising:
a sample data generation unit that generates a sample data set including a plurality of types of sample data values so as to encompass all types of input data to be used in a plurality of correction processing operations;
a first output value computing unit that subjects at least a portion of the sample data set generated by the sample data generation unit to correction processing in a preceding stage, to thus compute output data;
a data selection unit that selects data to be input during correction processing in a subsequent stage from among output data computed by the first output value computing unit and sample data values generated by the sample data generation unit;
a second output value computing unit that subjects the data selected by the data selection unit to correction processing in a subsequent stage, to thus compute output data; and
a table generation unit that generates a composite correction table from the sample data set generated by the sample data generation unit and output data computed by the second output value computing unit.

11. The table generation apparatus according to claim 10, wherein a plurality of correction processing operations include a spatial variation correction processing that suppresses color variations in accordance with a position in an image and another factor variation correction processing for suppressing color variations caused by another factor, wherein the sample data generation unit generates, as the sample data value, a plurality of types of pieces of color data and positional information showing positions in an image, wherein the first output value computing unit computes output data by performing either correction processing for the other factor or the spatial variation correction processing, and wherein the second output value computing unit computes output data by performing the remaining one of the other factor variation correction processing and the spatial variation correction processing.

12. The table generation apparatus according to claim 11, wherein the other factor variation correction processing is implemented by use of a time varying correction table where sample color data are associated with color data that are used when time varying variations in the sample color data have been corrected, wherein the spatial variation correction processing is implemented by use of a spatial correction table that associates with each other sample color data, positional information, and color data which are used when color variations in sample color data arising in a position corresponding to the positional information have been corrected, wherein the first output value computing unit computes output color data corresponding to color data generated by the sample data generation unit by use of the time varying correction table, wherein the data selection unit selects output color data computed by the first output value computing unit and positional information generated by the sample data generation unit, wherein the second output value computing unit computes output color data corresponding to the output color data and the positional information, both of which have been selected by the data selection unit, by use of the spatial correction table, and wherein the table generation unit generates a composite correction table which associates the color data and the positional information, which have been generated by the sample data generation unit, with the output color data computed by the second output value computing unit.

13. A table generation apparatus for generating a composite correction table used for implementing a plurality of correction processing operations, wherein a plurality of the correction processing operations include single table correction processing implemented by use of a single correction table and a plurality of table correction processing operations implemented by use of a plurality of correction table operations, the apparatus comprising:

a sample data generation unit that generates a sample data set including a plurality of types of sample data values so as to encompass all types of input data to be used in a plurality of correction processing operations;

a first output value computing unit that subjects at least a portion of the sample data set generated by the sample data generation unit to any one of single table correction processing and a plurality of table correction processing operations, to thus compute output data;

a data selection unit that selects data to be input during a remaining one of single table correction processing and a plurality of table correction processing operations, from among output data computed by the first output value computing unit and sample data values generated by the sample data generation unit;

a second output value computing unit that subjects the data selected by the data selection unit to remaining correction processing of the single table correction processing and the plurality of table correction processing operations, to thus compute output data; and a table generation unit that generates a composite correction table from the sample data set generated by the sample data generation unit and output data computed by the second output value computing unit.

14. The table generation apparatus according to claim 13, wherein the single table correction processing is implemented by use of a time varying correction table that associates sample input color data with sample output color data, wherein the plurality of table correction processing operations are implemented by selecting a spatial correction table, which is to be applied according to a position in an image, from a plurality of space correction tables where the sample input color data and the sample output color data are associated with each other, and applying the selected spatial correction table, wherein the sample data generation unit generates a sample data set including color data and positional information showing a position in an image, wherein the first output value computing unit computes output color data corresponding to color data generated by the sample data generation unit by use of the time varying correction table, wherein the data selection unit selects output color data computed by the first output value computing unit and positional information generated by the sample data generation unit, wherein the second output value computing unit selects a spatial correction table corresponding to the positional information selected by the data selection unit, and computes output color data corresponding to the output color data selected by the data selection unit through use of the selected spatial correction table, and wherein the table generation unit generates a composite correction table on the basis of the data set including the color data and the positional information, both of which have been generated by the sample data generation unit, and output color data computed by the second output value computing unit, to thus generate a composite correction table.

15. An image forming system comprising:

a table generation apparatus that generates a composite correction table used for implementing a plurality of correction processing operations; and an image forming apparatus that forms an image by use of the composite correction table, the number of pieces of output data output after correction processing in a preceding stage differing from the number of pieces of input data input to correction processing in a subsequent stage, wherein the table generation apparatus comprises:

a sample data generation unit that generates a sample data set including a plurality of types of sample data values so as to encompass all types of input data to be used in a plurality of correction processing operations;

a first output value computing unit that subjects at least a portion of a sample data set generated by the sample data generation unit to correction processing in a preceding stage, to thus compute output data;

a data selection unit that selects data to be input during correction processing in a subsequent stage from among output data computed by the first output value computing unit and sample data values generated by the sample data generation unit;

a second output value computing unit that subjects the data selected by the data selection unit to correction processing in a subsequent stage, to thus compute output data; and a table generation unit that generates a composite correction table from a sample data set generated by the sample data generation unit and output data computed by the second output value computing unit, and wherein the image forming apparatus comprises:

an image processing unit that subjects input image data to correction processing by use of the composite correction table generated by the table generation unit; and an image forming unit that forms an image by use of the image data having undergone correction processing performed by the image processing unit.

16. A computer implemented table generation method for generating a composite correction table used for implementing a plurality of correction processing operations, wherein the number of pieces of output data output after correction processing in a preceding stage differs from the number of pieces of input data input to correction processing in a subsequent stage, the method comprising a processor performing the steps of:

generating a sample data set including a plurality of types of sample data values so as to encompass all types of input data to be used in a plurality of correction processing operations;

subjecting at least a portion of the generated sample data set to correction processing in a preceding stage, to thus compute first output data;

selecting data to be input during correction processing in a subsequent stage from among the computed first output data and the generated sample data values;

subjecting the selected data to correction processing in a subsequent stage, to thus compute second output data; and generating a composite correction table from the generated sample data set and the computed second output data.

17. A computer readable medium storing a program that causes a computer to run a process for generating a composite correction table used for implementing a plurality of correction processing operations, the number of pieces of output data output after correction processing in a preceding stage differing from the number of pieces of input data input to correction processing in a subsequent stage, the process comprising:

generating a sample data set including a plurality of types of sample data values so as to encompass all types of input data to be used in a plurality of correction processing operations;

subjecting at least a portion of the generated sample data set to correction processing in a preceding stage, to thus compute first output data;

selecting data to be input during correction processing in a subsequent stage from among the computed first output data and the generated sample data values;

subjecting the selected data to correction processing in a subsequent stage, to thus compute second output data; and generating a composite correction table from the generated sample data set and the computed second output data.

* * * * *